(12) United States Patent
Fox et al.

(10) Patent No.: US 7,770,129 B2
(45) Date of Patent: Aug. 3, 2010

(54) VIEWABLE DOCUMENT SECTION

(75) Inventors: Eric Fox, Seattle, WA (US); Hyun-Suk Kim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 11/358,418

(22) Filed: Feb. 22, 2006

(65) Prior Publication Data

US 2006/0142966 A1     Jun. 29, 2006

Related U.S. Application Data

(62) Division of application No. 10/294,628, filed on Nov. 15, 2002, now Pat. No. 7,689,927.

(51) Int. Cl.
*G06F 3/00* (2006.01)
(52) U.S. Cl. ................. 715/786; 715/807
(58) Field of Classification Search ............. 715/786, 715/807, 800, 788, 801
See application file for complete search history.

(56) References Cited

U.S. PATENT DOCUMENTS

| | | | |
|---|---|---|---|
| 4,633,436 A | 12/1986 | Flurry | |
| 4,692,858 A * | 9/1987 | Redford et al. | 715/744 |
| 4,831,556 A | 5/1989 | Oono | |
| 5,194,852 A * | 3/1993 | More et al. | 345/182 |
| 5,553,225 A | 9/1996 | Perry | |
| 5,664,132 A | 9/1997 | Smith | |
| 5,815,151 A * | 9/1998 | Argiolas | 715/800 |
| 6,084,598 A | 7/2000 | Chekerylla | |
| 6,157,381 A | 12/2000 | Bates et al. | |
| 6,661,409 B2 | 12/2003 | Demartines et al. | |
| 7,499,033 B2 * | 3/2009 | Wilde et al. | 345/173 |

* cited by examiner

*Primary Examiner*—Ryan F Pitaro
(74) *Attorney, Agent, or Firm*—Shook, Hardy & Bacon, L.L.P.

(57) ABSTRACT

Systems, methods, and computer-readable media that include computer-executable instructions stored thereon for displaying electronic documents keep track of portions of an electronic document that have appeared in a user interface window at some point in time (i.e., the portions that have been actually viewed by the user). These portions of the electronic document that have actually been viewed are designated the "viewable document section" of the electronic document. In some examples, scrolls bars and/or other electronic document view shifting elements become available to the user only if the electronic document includes a viewable document section that does not appear in the user interface window, and these scroll bars and/or other view shifting elements may be limited based on the content of the viewable document section (not the entire electronic document). If the user changes the user interface window to include portions of the electronic document that previously had not been in view, the viewable document section then changes to include this new, previously unseen portion. Accordingly, as the user inputs electronic ink or other information into the document, scroll bars or the like will not appear until the user takes steps to bring previously unseen ink or other information into view in the user interface window.

18 Claims, 9 Drawing Sheets

VIEWABLE DOCUMENT SECTION

RELATED APPLICATION DATA

This application is a divisional of U.S. patent application Ser. No. 10/294,628 filed Nov. 15, 2002, now U.S. Pat. No. 7,689,927. This priority application is entirely incorporated herein by reference.

FIELD OF THE INVENTION

The present invention relates generally to graphical user interfaces. Specifically, aspects and examples of the present invention relate to graphical user interfaces including a user interface window in which scroll bars (or other document view shifting elements) are provided only when portions of the electronic document previously present in the interface window exist outside the interface window. Systems and methods according to examples of the present invention may eliminate the rendering of scroll bars (or the like) in some situations where providing scroll bars (or the like) may prove distracting or confusing to the user.

BACKGROUND

Originally, computing systems were extremely expensive and bulky, thereby limiting their availability and impact on our daily lives. Advancements in technology, however, have progressively and dramatically reduced the cost and size of computing systems while also greatly increasing the speed and computing power of the systems. Increasingly, more and more aspects of our lives have come to include some computer element associated with them. Indeed, computing systems have revolutionized modern life.

To take advantage of benefits potentially available through use of computing systems, computer users must be able to interact with their computers, to input the necessary information and/or data and to receive the desired output from the computer. In recent years, great advances also have been made in providing user friendly interfaces for communication between users and computing systems. Graphical user interfaces ("GUIs"), like those used in connection with computer programs operating on a WINDOWS® based computer operating system (available from Microsoft Corporation of Redmond, Wash.), have become a popular choice for computer users. In such GUIs, a computer user may easily input and manipulate information in the computing system using a keyboard and/or a mouse-type input device (including trackballs, roller balls, and other similar input devices).

Other technological advances have further expanded the manner in which computer users may interact with their computing systems. Recently, stylus-based computing systems have become popular in which users interact with their computing systems using a pen or pencil shaped "stylus" to input and/or manipulate information. Examples of such stylus-based computing systems include personal digital assistants ("PDAs") and tablet personal computing systems ("tablet PCs"). Using at least some examples of stylus-based computing systems, a user can write on an electronic screen using the stylus, and the computing system will save the user's handwritten text, either in its original form (as electronic "ink") and/or as machine generated text, which may be obtained, for example, using a handwriting recognizer to convert the original handwritten text into an electronic form.

When using a stylus or electronic pen to write on electronic paper (e.g., in a pen-based computing system), the ink stroke may trail beyond the edge of the active user interface window during a pen stroke. When possible, such pen-based computing systems may continue recording the movement of the pen, even when it is outside of the active user interface window, because this additional information may help understand the writer's intent. For example, when writing a page of electronic notes, a writer may write the letter "y" toward the bottom of the active user interface window for the note. In some instances, the tail of this letter "y" may trail outside the active user interface window, but still on the electronic digitizer screen. If the portion outside the user interface window (i.e., the tail) is not recorded, the system may interpret the "tailless" letter "y" incorrectly as the letter "u." This error may have a cascading affect on future actions, such as when the electronic ink is converted to machine generated text. Accordingly, some stylus or pen-based computing systems will continue to record movement of the electronic pen outside the active user interface window of the electronic document and maintain that pen movement as part of the electronic ink associated with the electronic document. That electronic ink exists outside the current view of the active user interface window.

In many WINDOWS® Operating System based applications, or other similar applications, the standard way of dealing with electronic document content located outside of the current active user interface window is through use of one or more scroll bars. A scroll bar indicates to a user that there is content out of view, and it allows the user to move this content into the view of the user interface window. In the above situation, however, in which the tail of a letter or other electronic ink or information trails outside of the active user interface window, the appearance of scroll bars while writing is still occurring may be distracting or confusing to the user, and the time required to produce the scroll bars may result in rendering delays and/or some shifting of the rendered content.

Accordingly, there is a need for electronic document display systems and methods that can overcome one or more of the deficiencies identified above.

SUMMARY

Aspects of the present invention relate to systems, methods, and computer-readable media that include computer-executable instructions stored thereon for displaying electronic documents. In accordance with at least some examples of the invention, these systems and methods keep track of all portions of an electronic document that have appeared in the user interface window at some point in time (i.e., keeps track of the portions that have been actually viewed or displayed). These portions of the electronic document that have actually been viewed or displayed are designated the "viewable document section" of the electronic document. Scrolls bars and/or other electronic document view shifting elements become available to the user only if the electronic document includes a viewable document section portion that does not appear in the user interface window, and these scroll bars and/or other view shifting elements are limited based on the content of the viewable document section. If the user changes the user interface window size and/or location to include portions of the electronic document that previously had not been in view, the viewable document section then changes to include this new, previously unseen portion of the electronic document. Accordingly, as the user inputs electronic ink or other information into the electronic document, scroll bars or the like will not appear until the user takes steps to bring previously unseen ink or information into view in the user interface window.

Aspects of this invention also relate to data structures that store and/or track the viewable document section of an electronic document.

BRIEF DESCRIPTION OF THE DRAWINGS

The above and other objects, features, and advantages of the present invention will be readily apparent and fully understood from the following detailed description, taken in connection with the appended drawings, which include.

DETAILED DESCRIPTION

As described above, examples of the present invention relate to systems, methods, and computer-readable media for providing graphical user interfaces in which scroll bars (or other document view shifting elements) are provided when the electronic document includes portions outside the interface window that were previously included within the interface window. The following describes various examples of the invention in more detail.

The following description is divided into sub-sections to assist the reader. The sub-sections include: Terms, The Viewable Document Section—Generally, The Viewable Document Section—Specific Examples, Example Hardware, and Conclusion.

I. Terms

Ink—A sequence or set of one or more handwritten strokes. A sequence of strokes may include one or more strokes in an ordered form. The sequence may be ordered, for example, by the time the stroke was captured or by where the strokes appear on a page. Other orders also are possible. A set of strokes may include one or more sequences of strokes or unordered strokes or any combination thereof. The ink may further include properties that may be defined for the strokes. The ink may further respond to methods and trigger events.

Stroke—A sequence or set of one or more captured points. For example, when rendered, the sequence of points may be connected with lines. Alternatively, a stroke may be represented as a point and a vector in the direction of the next point. Further, a stroke may be referred to as a data structure containing a simple list (or array or table) of points. In short, a stroke is intended to encompass any representation of points or segments relating to ink, irrespective of the underlying representation of points and/or what connects the points.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates $(X, Y)$, polar coordinates $(r, \Theta)$, three dimensional coordinates $((X, Y, Z), (r, \Theta, \rho), (X, Y, t$ (where t is time$)), (r, \Theta, t))$, four dimensional coordinates $((X, Y, Z, t)$ and $(r, \Theta, \rho, t))$, and other techniques as known in the art.

Render—The process of determining how graphics (and/or ink) are to be displayed, whether on a screen or printed.

Figure 1:
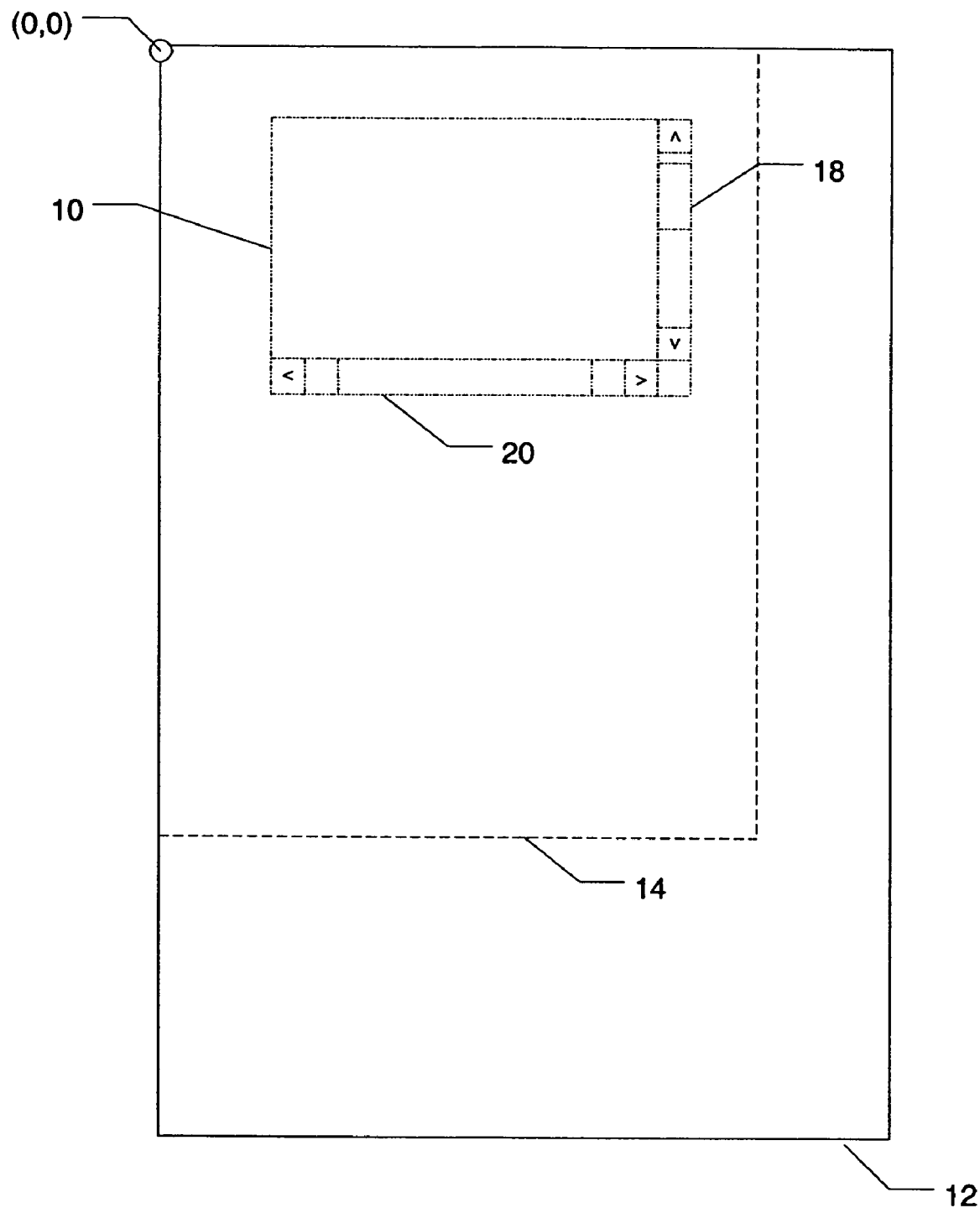
FIG. 1, which illustrates certain terms used in this specification.

User Interface Window—The area of a display device in which an electronic document is rendered. This window also may be called the "active window" in this specification. FIG. 1 helps illustrate an example of this element. As illustrated in FIG. 1, the user interface window 10 is the active window on a display device in which an electronic document or a portion of an electronic document may be rendered (the user interface window 10 is shown in double dot/dashed lines in FIG. 1). The user interface window may be any desired size, up to and including the size of the screen of the display device. The size of this user interface window 10 also may be readily changed by the user, e.g., by entering new dimensions, by choosing from preset dimensions, by clicking and dragging on a side or corner of the window 10, by tapping and dragging on a side or corner of the window 10, or in any suitable manner.

Scroll Bar—A user interface element that allows a user to control the portion of the electronic document that is rendered in the user interface window. As used in this specification, the term "scroll bar" should be construed broadly to include any type of element in a graphical user interface that allows a user to selectively change the portion of an electronic document visible in a user interface window, including traditional scroll bars, page up and/or down buttons, move up and/or down buttons, etc. Examples of scroll bars are shown in FIG. 1, as elements 18 and 20.

Bounding Box—A term meaning all points associated with an electronic document. A "bounding box" may be thought of as an object that completely surrounds all information in an electronic document. While a "bounding box" may take on any suitable shape, in some examples of the invention, the "bounding box" is considered to be the smallest rectangle that completely encloses all information in an electronic document with respect to a device on which it is displayed (e.g., a computer screen). FIG. 1 illustrates a bounding box as element 12. In some instances, the bounding box 12 may completely fit within the user interface window 10, or, as shown in FIG. 1, it may extend outside of the user interface window 10.

Viewable Document Section—That portion of an electronic document that has been rendered in the user interface window at some time. While a "viewable document section" ("VDS") can be considered as corresponding to any suitable shape that encloses the relevant portion of the electronic document, in some examples of the invention, the viewable document section is considered to have a rectangular shape. In general, the "viewable document section" will contain a subset of or all of the points including within the bounding box of the electronic document. A sample of a viewable document section is shown in FIG. 1 as element 14. In some instances, the viewable document section 14 may completely fit within the user interface window 10 and/or it may extend outside of the user interface window 10 to the full size of the bounding box 12 of the electronic document. The viewable document section for a specific electronic document can be reset, for example, each time the electronic document is opened, each time a user or the system takes some predetermined action (e.g., print, save, etc.), at any other suitable time, and/or never, without departing from the invention.

Text—The term "text," as used in this specification, generically means information entered into a computing system. This term generically includes within its scope electronic ink, machine generated text, drawing strokes, pictures, figures, graphics, and the like.

While FIG. 1 shows the user interface window 10, the bounding box 12 of the electronic document, and the viewable document section 14 as rectangular shapes, of course, any other shape or even no specific shape can be used without departing from the invention. These shapes are used as illustration aids. In actuality, the bounding box and the viewable document sections are data sets. Also, while FIG. 1 shows elements 12 and 14 sharing a common origin point (0,0), this is merely an example and not a requirement. At any given time, the data point representing the upper and/or leftmost corners of elements 10, 12, and 14 could be located at any suitable point without departing from the invention.

II. The Viewable Document Section—Generally

As described above, aspects of this invention relate to methods, systems, and computer-readable media including computer-executable steps stored thereon for performing a method of displaying information on a display device.

In one example, a method according to this invention may include: (a) providing a user interface window; (b) displaying at least a portion of an electronic document in the user interface window; and (c) storing a viewable document section, wherein the viewable document section includes information indicative of all portions of the electronic document that have appeared in the user interface window. Additional examples of methods according to the invention may further include: (a) providing a system that enables a user to change a size of the user interface window, and/or (b) providing a system that enables a user to change a displayed portion of the electronic document in the user interface window when at least some information indicated by the viewable document section does not appear in the user interface window (in some examples, the system for changing the displayed portion of the electronic document is not provided when all information indicated by the viewable document section appears in the user interface window).

In accordance with at least some examples of the invention, when the user interface window is enlarged, the viewable document section also changes, if necessary, to include information indicative of any new portion of the electronic document displayed in the user interface window that was not previously displayed in the user interface window. The size of the user interface window may be changed in any suitable manner, such as through a user input device drag operation (e.g., a click-and-drag operation with a mouse or a tap-and-drag or hover-and-drag operation with a stylus), selecting new dimensions, selecting a new or preset size, etc. Likewise, the displayed portion of the electronic document also may be changed in any suitable manner, such as through the use of scroll bars, page up and/or down buttons, move up and/or down buttons, or the like.

While the viewable document section and the above-described methods according to examples of the invention can be used with any type of electronic document, such as documents in a word processing system, a drawing application, etc., in some examples of the invention, the electronic document includes electronic ink data.

In some examples of the invention, the initial size of the viewable document section will correspond to a size of the user interface window when an electronic document is first created and/or opened. As another example, the initial viewable document section size will correspond to the portion of the electronic document actually visible in the user interface window irrespective of the window size. This initial size may be reset each time an electronic document is opened, or, as another alternative, the viewable document section size can be stored with the electronic document so that the previous viewable document section size will be available whenever the document is reopened on the system. Any suitable default or initial viewable document section size can be used without departing from the invention.

Additional aspects and examples of the invention relate to display systems that display information using a viewable document section according to the invention. Examples of such display systems may include a display device and a processor for:

(a) rendering a user interface window, (b) rendering at least a portion of an electronic document in the window, and (c) storing a viewable document section as described generally above (and examples of which are described in more detail below).

Still additional aspects and examples of this invention relate to computer-readable media including computer-executable instructions for performing methods for displaying information on a display device as described above.

Yet other aspects and examples of this invention relate to computer-readable media having stored thereon a data structure for providing a viewable document section. The data structure according to some examples of the invention may include a first data field containing data indicative of an electronic document; and a second data field containing data indicating an amount of the electronic document that has appeared in a user interface window of a display device. In some more specific examples according to these aspects of the invention, the data in the first data field may include data indicative of coordinates of a bounding box containing all points in the electronic document, and/or the data in the second data field may include data indicative of coordinates that enclose all portions of the electronic document that have appeared in the user interface window.

While examples of the invention have been generally described above, the following description provides more detailed examples of methods, systems, and computer-readable media according to the present invention.

III. The Viewable Document Section—Specific Examples

In some examples of this invention, electronic ink and/or other information included in an electronic document are rendered in a user interface window 10. Typically, in at least some examples of the invention, the systems and methods render the electronic document as though previously unseen portions of it did not exist (e.g., as if strokes and/or other information located outside the active window did not exist), even though the system may still electronically capture strokes (or portions thereof) entered or made outside the active window. In systems and methods according to some examples of the invention, the portion of the electronic document that has been displayed in the user interface window is tracked (also called the "viewable document section" 14). As the user exposes previously unseen portions of the electronic document (e.g., by changing the user interface window 10 size, moving the user interface window 10, etc.), the viewable document section 14 grows to indicate the new additional portions of the electronic document (if any) that have been displayed in the user interface window 10.

In general, when the user interface window 10 is as large as or larger than the viewable document section 14 (horizontally and/or vertically), no scroll bars (or other view changing elements) are displayed and/or otherwise made available to the user. However, when the user interface window 10 is smaller than the viewable document section 14 (horizontally and/or vertically), systems and methods according to some examples of the invention display (or otherwise make available) scroll bar(s) 18, 20 and/or other view changing elements to indicate to the user that there is more information than what the user interface window shows. In some examples of the invention, the extreme limits of the scroll bars 18 and 20 and/or other view changing elements are determined and/or scaled based on the size of the viewable document section 14, not the bounding box 12 of the electronic document. In some examples, when the scroll bars 18 and 20 (or other view display shifting elements) are at their minimum positions, the leftmost and/or topmost portions of the viewable document section are shown in the user interface window 10. When the scroll bars 18 and 20 (or other view display shifting elements) are at their maximum positions, the rightmost and/or bottommost portions of the viewable document section are shown in the user interface window 10.

Figure 2:
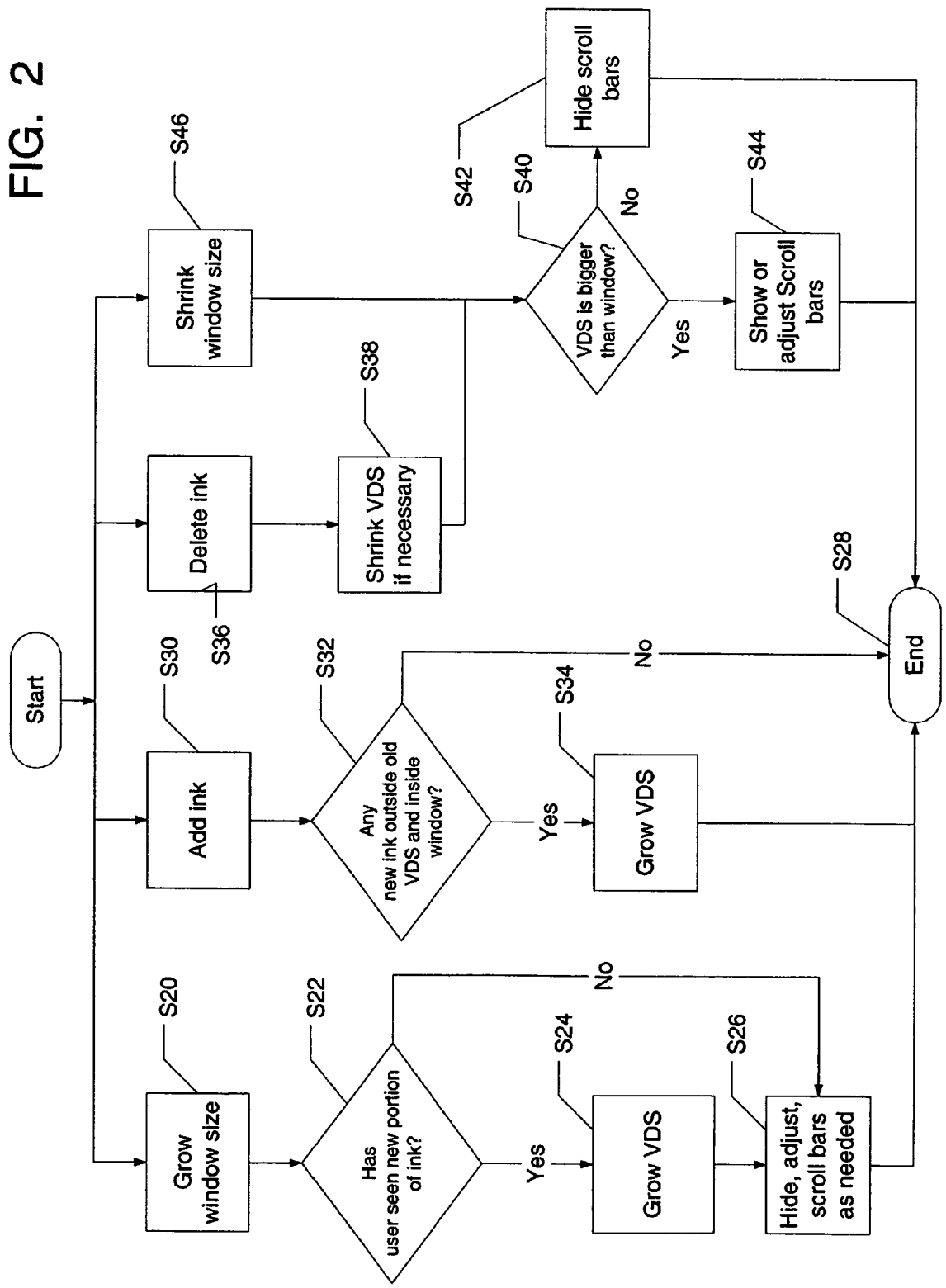
FIG. 2, which illustrates a flow chart of various procedures and methods that can be used for managing the viewable document section size using examples of this invention.

FIG. 2 includes a flow diagram that generally describes how systems and methods according to some examples of the invention manage the size of the viewable document section 14. As one example, a user may enlarge (or grow) the user interface window 10 size (Step S20). When this occurs, the viewable document section also may grow, if enlarging the user interface window 10 also exposes previously unseen portions of the electronic document (e.g., electronic ink or other information). In the illustrated procedure, the system and/or method first determine whether this enlarging action has caused previously unseen portions of the electronic document to come into view in the user interface window 10 (Step S22). If YES, the size of the viewable document section ("VDS") is enlarged to additionally include the newly viewed portion of the electronic document (Step S24), and the scroll bars may be changed (e.g., hidden, resized, etc.) (Step S26), if necessary, to correspond to the new viewable document section 14 size (scroll bars or the like may not be needed, e.g., if all of the enlarged viewable document section 14 fits within the enlarged user interface window 10). The procedure then ends (Step S28).

If, the answer is NO at Step S22 (no new ink or other information has been exposed), Step S24 may be skipped, and the procedure may proceed at Step S26, in which the scroll bars are adjusted, hidden, etc., if necessary. The procedure then ends (Step S28).

As another option, a user may add additional ink (or other information) to an electronic document (Step S30). When ink (or other information) is added to an electronic document, this may cause new ink to be added in an area between the previous viewable document section 14 and the user interface window 10 (e.g., if the previous viewable document section 14 was completely within the user interface window 10). In this situation, the viewable document section also will grow, if necessary, with the electronic document's bounding box 12, at least until the electronic document's bounding box 12 stretches beyond the user interface window 10 (horizontally or vertically). In this procedure, the systems and/or methods according to this example of the invention determine whether this has happened at Step S32. If YES, the viewable document section is grown to include the newly added information visible in the user interface window (Step S34), and the procedure ends (Step S28). If the newly added ink (or other added information) is completely within the existing viewable document section (Answer NO at Step S32), the procedure simply ends (Step S28) without changing the viewable document section.

Another action that may occur in accordance with at least some examples of the invention includes deletion of existing ink or other information from the electronic document (Step S36). In that case, the viewable document section 14 is shrunk, if necessary, to eliminate the deleted ink or other information (Step S38). The system and/or methods then determine whether the re-sized viewable document section 14 is larger than the user interface window 10 (Step S40). If NO, any existing scroll bars are hidden and/or no scroll bars are shown (Step S42), and the procedure ends (Step S28). If the viewable document section 14 is larger than the user interface window 10 (answer YES at Step S40), scroll bars are added or existing scroll bar sizes are adjusted, if necessary, to correspond to the new viewable document section size (Step S44), and the procedure ends (Step S28).

When a user decreases the user interface window size (Step S46), this will not affect the viewable document section size, because in a pure shrinking operation, no new portions of the electronic document will be exposed (although the size of the scroll bars may change, if necessary). Systems and methods according to this example of the invention will carry out steps S40-S44, as necessary, in this procedure. Also when the user changes the portion of the document being viewed (e.g., using the scroll bars), this action also does not change the viewable document section size, because, as noted above, the scroll bars are limited or scaled in this example of the invention based on the size of the viewable document section.

Of course, the specific steps and order of steps shown in FIG. 2 are merely illustrative of an example of the invention. Various changes, modifications, additional steps, etc. can be included without departing from the invention. For example, a system or method according to the invention could allow the user to move the interface window to different locations in the electronic document to expose new portions of the document (e.g., through a "GO TO" command, a bottom of page command, a top of page command, next page command, previous page command, etc.), without departing from the invention. Also, systems and methods according to examples of the invention could serially pass through the various procedures in any order without departing from the invention.

Figure 3:
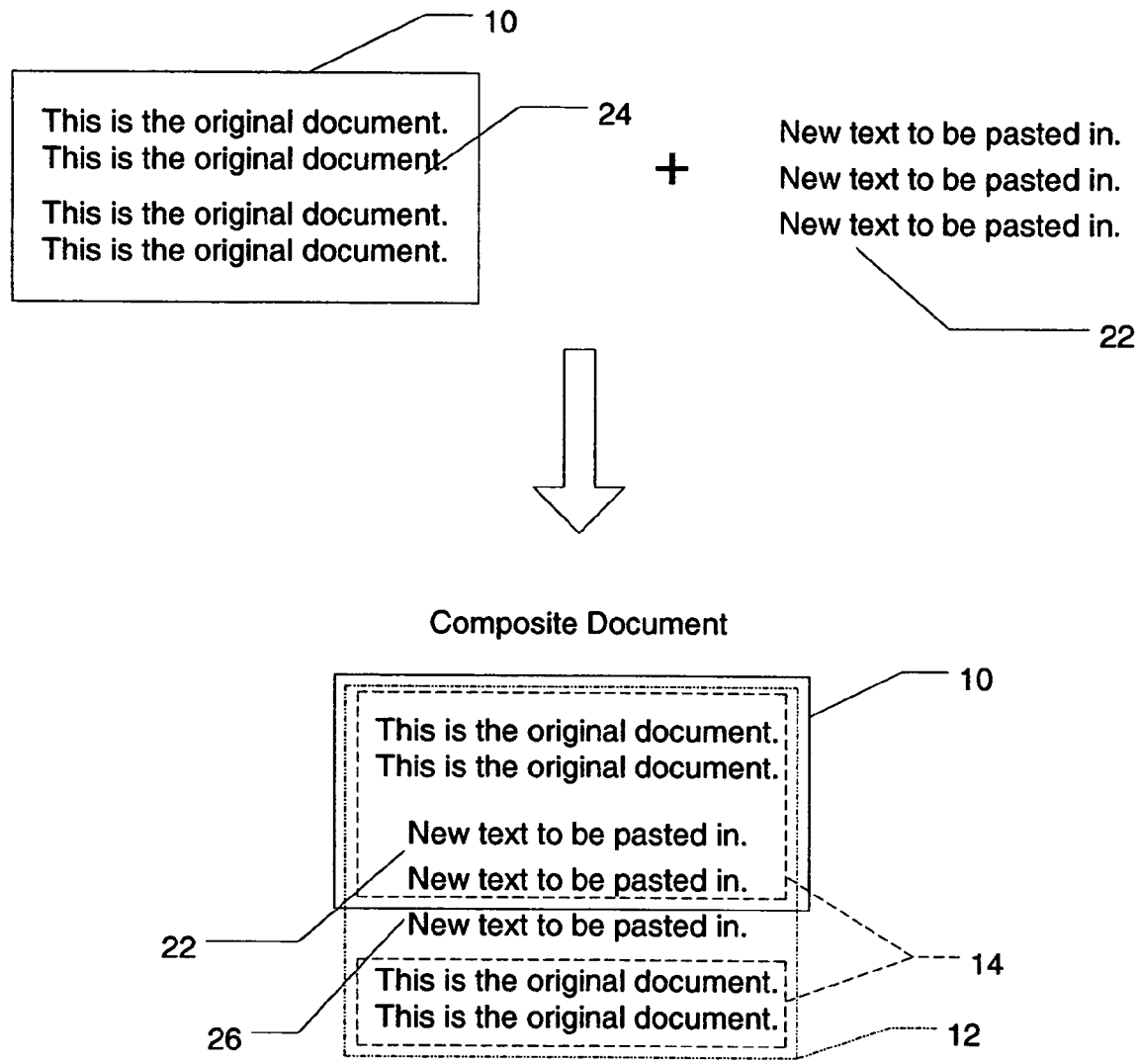
FIG. 3, which illustrates an example of adding text to an electronic document in some examples of the invention.

As another example, addition of ink or other information to an electronic document (e.g., through a paste operation) may take place within existing ink or information such that the newly added ink or information begins within the existing viewable document section and/or user interface window, but it ends outside the existing viewable document section and/or user interface window. FIG. 3 illustrates one example of this type of situation. As shown in this example, the original user interface window 10 contains the full document (text 24), and the original viewable document section and the original bounding box of the electronic document are completely included within and/or coincide with the user interface window 10. A user then pastes additional information 22 into the middle of the original text 24, resulting in the Composite Document shown at the bottom of FIG. 3. In the Composite Document, the user interface window 10 includes two lines of original text 24 and two lines of newly added text 22. The bounding box 12 of the electronic document contains all the text, as shown.

However, in this situation, using a strict definition of the term "viewable document section" as described above, the Composite Document contains two viewable document sections 14, namely, all portions remaining in the user interface window 10, plus the portion of the original document forced out of the user interface window 10 due to the addition of new text 22 (i.e., the last two lines of original text 24). These two portions of the viewable document section 14 are separated by text 26 that never appeared within the user interface window 10 in this electronic document (it may have been within a user interface window of another electronic document and/or another application). Systems and methods according to the invention could handle this situation in any suitable manner. For example, two or more viewable document sections 14 could be tracked for any electronic document, and the user could move between these independent viewable document sections in any suitable manner (e.g., using a user input device, a toggle switch, etc.) and/or indicate a desire to see the intermediate portions as well. As another alternative, the viewable document section may be defined to include all portions of the electronic document that ever appeared in the user interface window 10 and all portions in between. In that case, in the example shown in FIG. 3, the viewable document section would include the entire bounding box 12 of the electronic document, even though text 26 never actually appeared within the user interface window. The viewable document section 14 would not necessarily coincide with the entire bounding box 12 of the electronic document, although it does in this illustrated example (e.g., the electronic document may include portions before and/or after the first and/or last viewable document sections and/or to the left and/or right of the viewable document sections).

As described above, in Steps S24 and S34, the size of the viewable document section may be increased, e.g., when the user interface window size is enlarged and/or when additional ink or other information is added to the document. Using examples of systems and methods as shown in FIG. 2 in which the viewable document section is a rectangle (a "viewable rectangle" or "VR") that encloses all points that have been within the user interface window at some time and in which the upper left corner of the viewable rectangle is fixed at coordinate (0,0) (as shown in FIG. 1), the coordinates for the opposite corner of the new viewable document section after a potential growing procedure may be determined using the following relationship:

$$\text{new } VR = (0, 0) + \begin{pmatrix} \max[\min(\{X_{max}\text{of new Bounding Box}\}, \{X_{max}\text{of Window}\}), X_{max}\{\text{old } VR\}], \\ \max[\min(\{X_{max}\text{of new Bounding Box}\}, \{Y_{max}\text{of Window}\}), X_{max}\{\text{old } VR\}] \end{pmatrix},$$

wherein:
"new VR" stands for the coordinates of the opposite corners of the new viewable rectangle,
"min( . . . )" means the lowest value of the values that appear between the parentheses,
"max[ . . . ]" means the highest value of the values that appear between the brackets,
"$X_{max}$ of new Bounding Box" means the highest X-coordinate value within the electronic document after the new ink or other information is added or other changes were made,
"$X_{max}$ of Window" means the highest X-coordinate value of the user interface window after the changes are made to its size (if any),
"$X_{max}$ {old VR}" means the highest X-coordinate value within the viewable rectangle before the new ink or other information was added or other changes were made,
"$Y_{max}$ of new Bounding Box" means the highest Y-coordinate value within the electronic document after the new ink or other information is added or other changes were made,
"$Y_{max}$ of Window" means the highest Y-coordinate value of the user interface window after the changes are made to its size (if any), and
"$Y_{max}$ {old VR}" means the highest Y-coordinate value within the viewable rectangle before the new ink or other information was added or other changes were made.

When the viewable rectangle may need to shrink (e.g., when ink is eliminated as described in Steps S36 and S38), the coordinates for the opposite corners of the new viewable rectangle in that situation may be determined using the following relationship:

$$\text{new } VR = (0, 0) + \begin{pmatrix} \min[X_{max}\{\text{old}VR\}, X_{max}\{\text{new Bounding Box}\}], \\ \min[Y_{max}\{\text{old}VR\}, Y_{max}\{\text{new Bounding}Box\}] \end{pmatrix},$$

wherein:
"new VR" stands for the coordinates of the opposite corners of the new viewable rectangle,
"min[ . . . ]" means the lowest value of the values that appear between the brackets,
"$X_{max}$ {old VR}" means the highest X-coordinate value within the viewable rectangle before the changes are made,
"$X_{max}$ {new Bounding Box}" means the highest X-coordinate value within the electronic document after the changes are made,
"$Y_{max}$ {old VR}" means the highest Y-coordinate value within the viewable rectangle before the changes are made, and
"$Y_{max}$ {new Bounding Box}" means the highest Y-coordinate value within the electronic document after the changes are made.

As is readily apparent, these equations and relationships could be modified to use an upper left corner point other than the origin (0,0), if desired. Additionally, the coordinate for any and/or all corners of the viewable document section could be determined and recalculated in a similar manner without departing from the invention. Also, the equations could readily be changed to accommodate bounding box shapes and viewable document section shapes other than rectangles, if desired. Also, as is readily apparent from the discussion above, in some instances, only one coordinate (the horizontal or the vertical) of a viewable document section may change with any given change in window size, addition of ink, and/or deletion of ink.

Figure 4A:
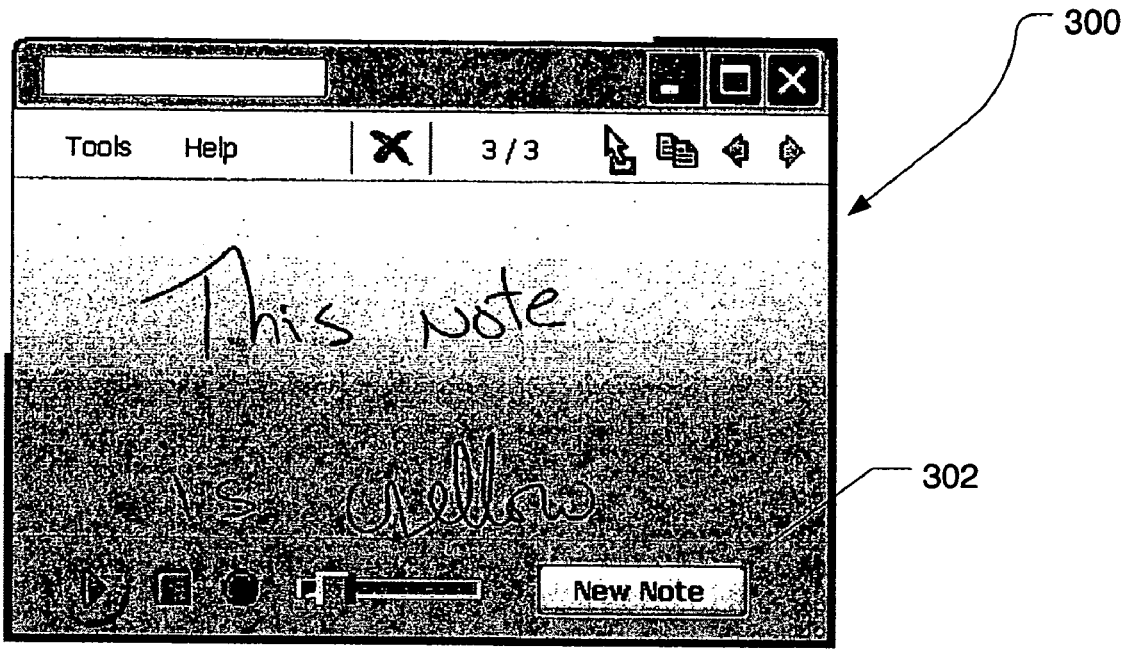
FIGS. 4a through 4f, which illustrate examples of user interface window renderings that appear when manipulating the user interface window in some examples of this invention.

FIGS. 4a through 4f illustrate user interface windows generated or rendered by systems and methods according to some examples of the invention in more detail. FIG. 4a shows a user interface screen 300 for an electronic sticky note on which a user has written the sentence, "This note is yellow." Notably, the tail of the letter "y" in "yellow" has drifted below the bottom level 302 of the user interface screen 300. Because the tail of the letter "y" still was written on the surface of a digitizing display device (described in more detail below), the system and method according to this example of the invention continued registering the stroke, even though it extended outside the confines of the interface screen 300. Even though this portion of the electronic document is located off the current interface screen 300, the systems and methods according to this example of the invention do not display scroll bars, because, at this time, the tail of the letter "y" has never appeared within the user interface window 300. In other words, because the tail of the letter "y" has never appeared within the user interface window 300, this tail is not included as part of the viewable document section (even though this tail does form a portion of the entire electronic document, as noted above). Scroll bars or the like are not provided at this time because, if scroll bars were to appear as soon as the pen tip drifted below the bottom level 302 of the interface screen 300, their appearance may be distracting or confusing to the user as she is writing, and/or their appearance may cause some confusing or distracting shifting of the displayed content.

Figure 4B:
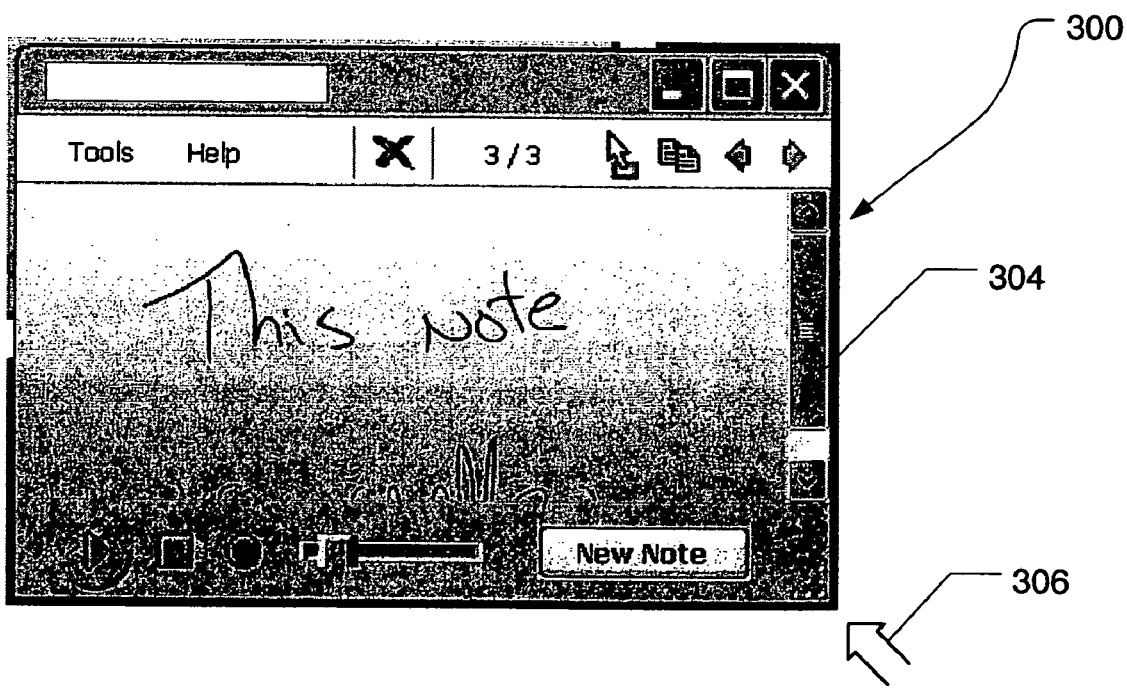

FIG. 4b illustrates the effects if the user makes the user interface window 300 smaller (e.g., by dragging one or more corners or edges of the window 300 inward using a drag-and-click or tap-and-click or hover-and-click action with a user input device), as indicated by arrow 306. As evident from FIG. 4b, now most of the words "is yellow" have disappeared from view in the interface window 300. Additionally, a scroll bar 304 has appeared to inform the user that some of the viewable document section is located out of view and to enable the user to scroll down to these previously viewed portions of the electronic document.

Figure 4C:
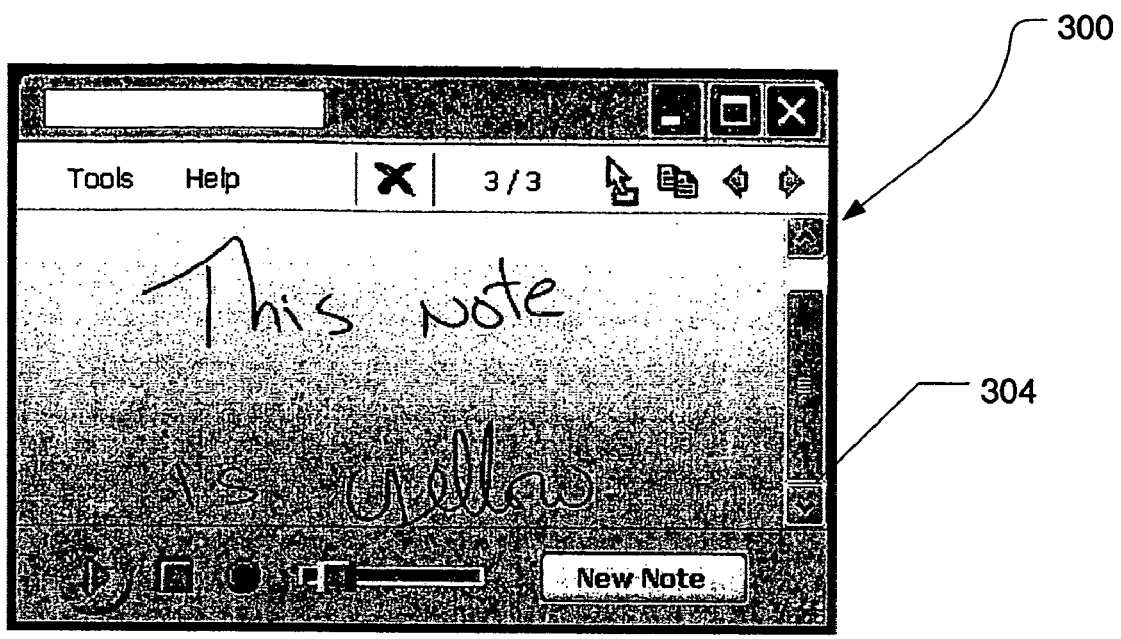

Notably, the scroll bar 304 in FIG. 4b is scaled to the size of the user interface window screen 300 from FIG. 4a, which corresponds to the viewable document section. This fact also is illustrated in FIG. 4c, in which a user has scrolled the image to the bottommost level of scroll bar 304. Notably, in FIG. 4c, the bottom of the letter "y" in "yellow" appears the same as it did in FIG. 4a (i.e., without the tail). This is because the viewable document section still does not contain the tail of the letter "y" (i.e., this tail has never been shown in interface window 300), so the scroll bar 304 is not scaled to expose it.

Figure 4D:
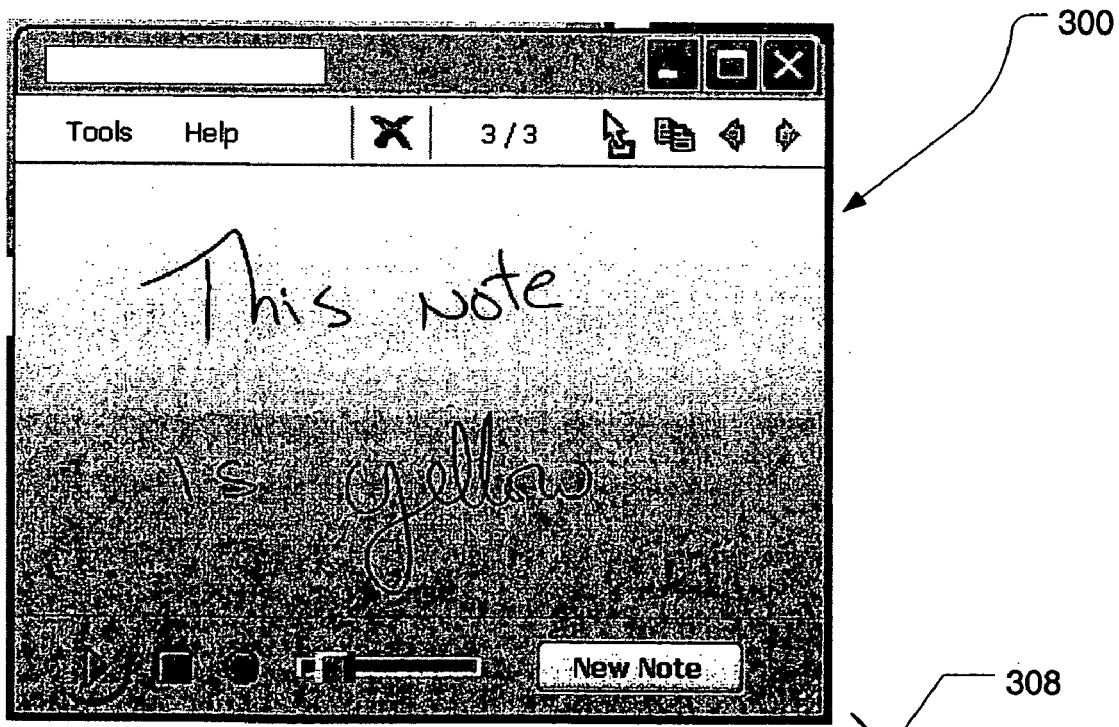

FIG. 4d illustrates the changes to the user interface window 300 when the user has increased its size (e.g., by dragging on a side or corner of the window using a click-and-drag or tap-and-drag or hover-and-drag action of the user input device), as illustrated by arrow 308. By enlarging the size of the window 300, this indicates the user's desire to view a larger portion of the electronic document. As the interface window 300 is enlarged, the viewable document section also is enlarged to correspond to everything that fits in the window 300, at least until the entire bounding box of the electronic document appears in window 300. This action causes the tail of the letter "y" to appear in the window 300. Notably, because the entire viewable document section now appears in the interface window 300, no scroll bars are needed (because nothing previously viewed exists outside the interface window 300). Thus, the previously rendered scroll bars are hidden or deleted by the system.

Figure 4E:
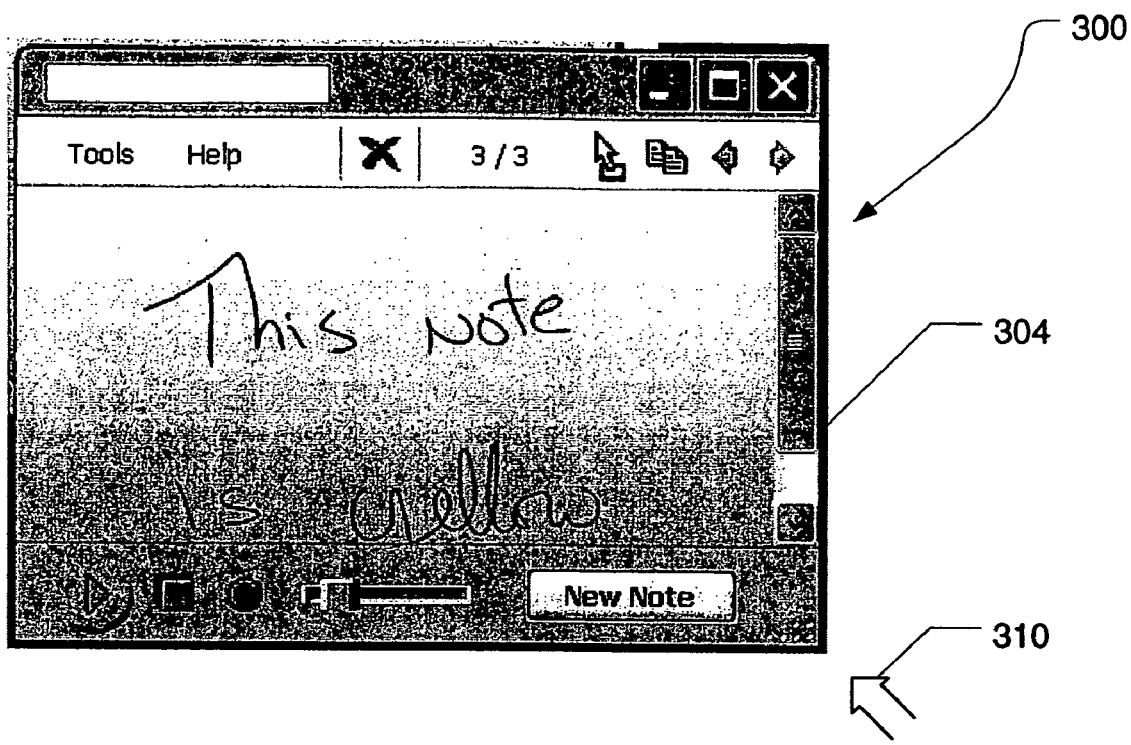

FIG. 4e illustrates what happens as the window size 300 is again reduced to the original size shown in FIG. 4a, as indicated by arrow 310. Notably, a scroll bar 304 now appears because a previously viewed portion of the electronic document (i.e., the tail of the letter "y" in this example) now exists outside the interface window 300. In other words, the tail of the letter "y" is now present in the viewable document section, because this tail was fully viewed in FIG. 4d. Therefore, the rendering of FIG. 4e includes a scroll bar 304 while the rendering of FIG. 4a did not.

Figure 4F:
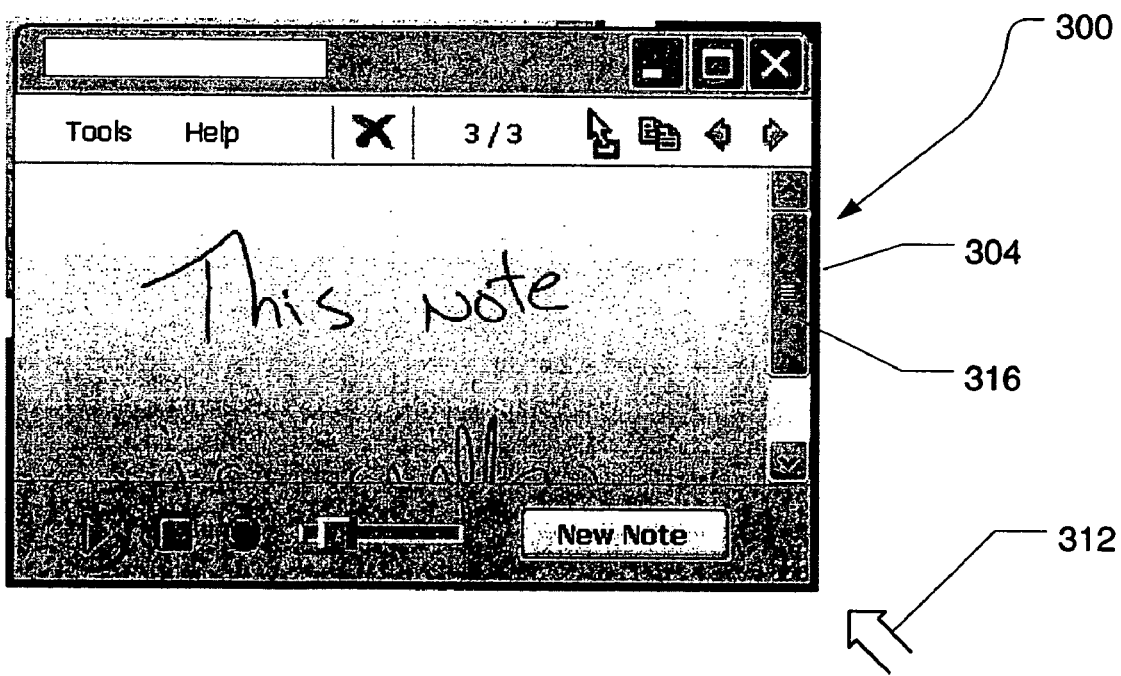

FIG. 4f shows the window 300 sized identical to its further reduced size in FIG. 4b (shown by arrow 312). Notably, the scroll bar handle 316 is smaller in FIG. 4f than it was in FIG. 4b because the size of the viewable document section is now increased to include the full tail of the letter "y." The scroll bar handle 316 is scaled to allow the user to fully navigate through the larger viewable document section (i.e., the scroll bar handle is smaller relative to the total size of the scroll bar 304).

Figure 5:
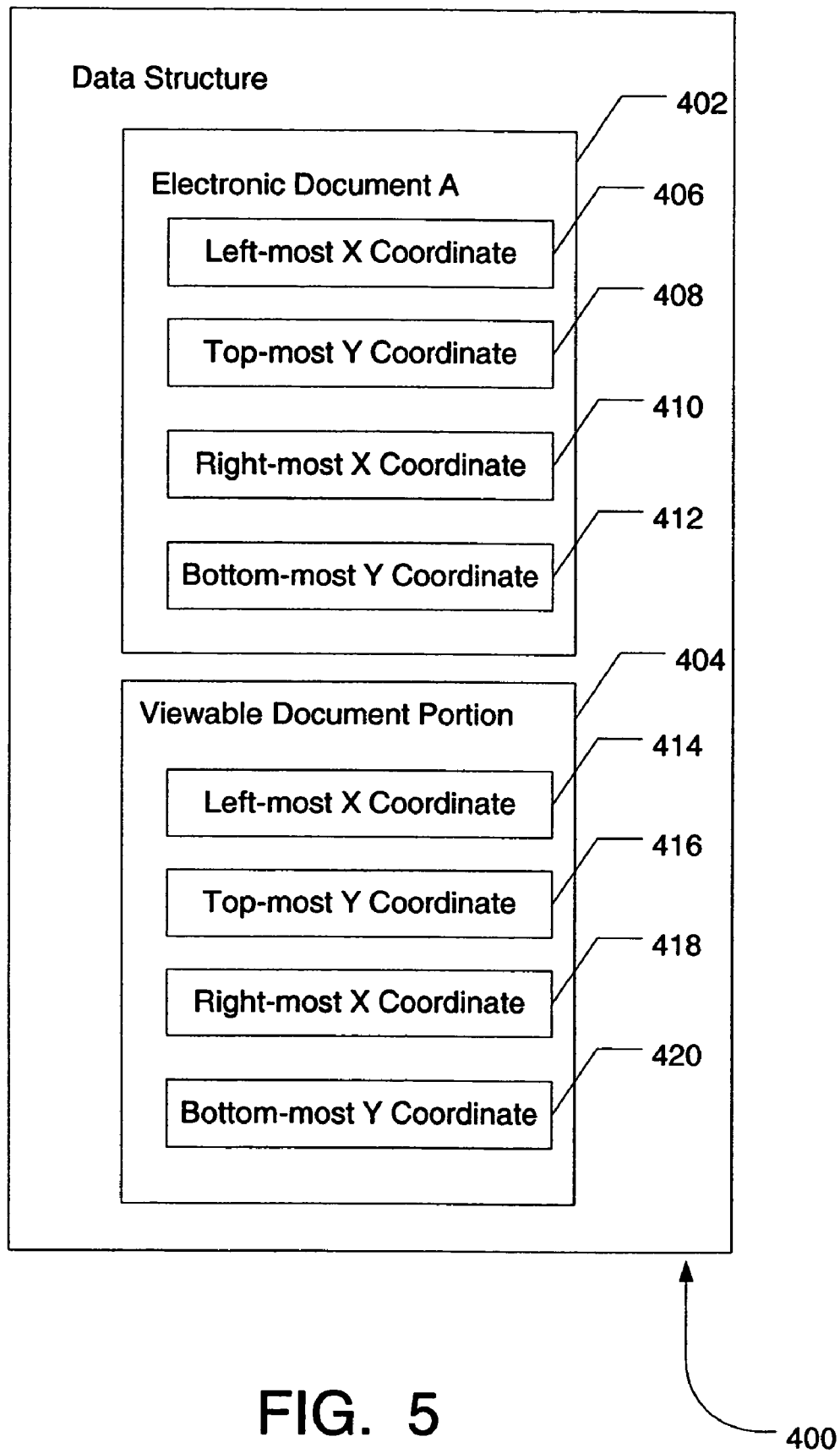
FIG. 5, which illustrates an example of a data structure that can be used in some examples of this invention.

FIG. 5 illustrates an example data structure 400 useful in accordance with some examples of the invention. As described above, the data structure 400 may include a first data field 402 containing data indicative of a display size (or the bounding box) of an electronic document; and a second data field 404 containing data indicating an amount of the electronic document that has appeared in a user interface window of a display device (the viewable document section). In some examples, the data in the first data field 402 may include data indicative of coordinates of a bounding box containing all points in the electronic document (e.g., data indicating the left-most X coordinate 406, data indicating the top-most Y-coordinate 408, data indicating the right-most X-coordinate 410, and data indicating the bottom-most Y-coordinate 412). Similarly, the data in the second data field 404 may include data indicative of coordinates of a box enclosing all portions of the electronic document that have appeared in the user interface window (e.g., data indicating the left-most viewed X-coordinate 414, data indicating the top-most viewed Y-coordinate 416, data indicating the right-most viewed X-coordinate 418, and data indicating the bottom-most viewed Y-coordinate 420).

As a variation of the data structure 400, the bounding box of the electronic document and/or the viewable document section may default to the upper left-most corner corresponding to the (0,0) origin of the digitizer. In that event, it would not be necessary for the data structure to include the left-most X-coordinates and/or the upper-most Y-coordinates of the bounding box and/or the viewable document section (i.e., these points would default to (0,0)).

IV. Example Hardware

Figure 6:
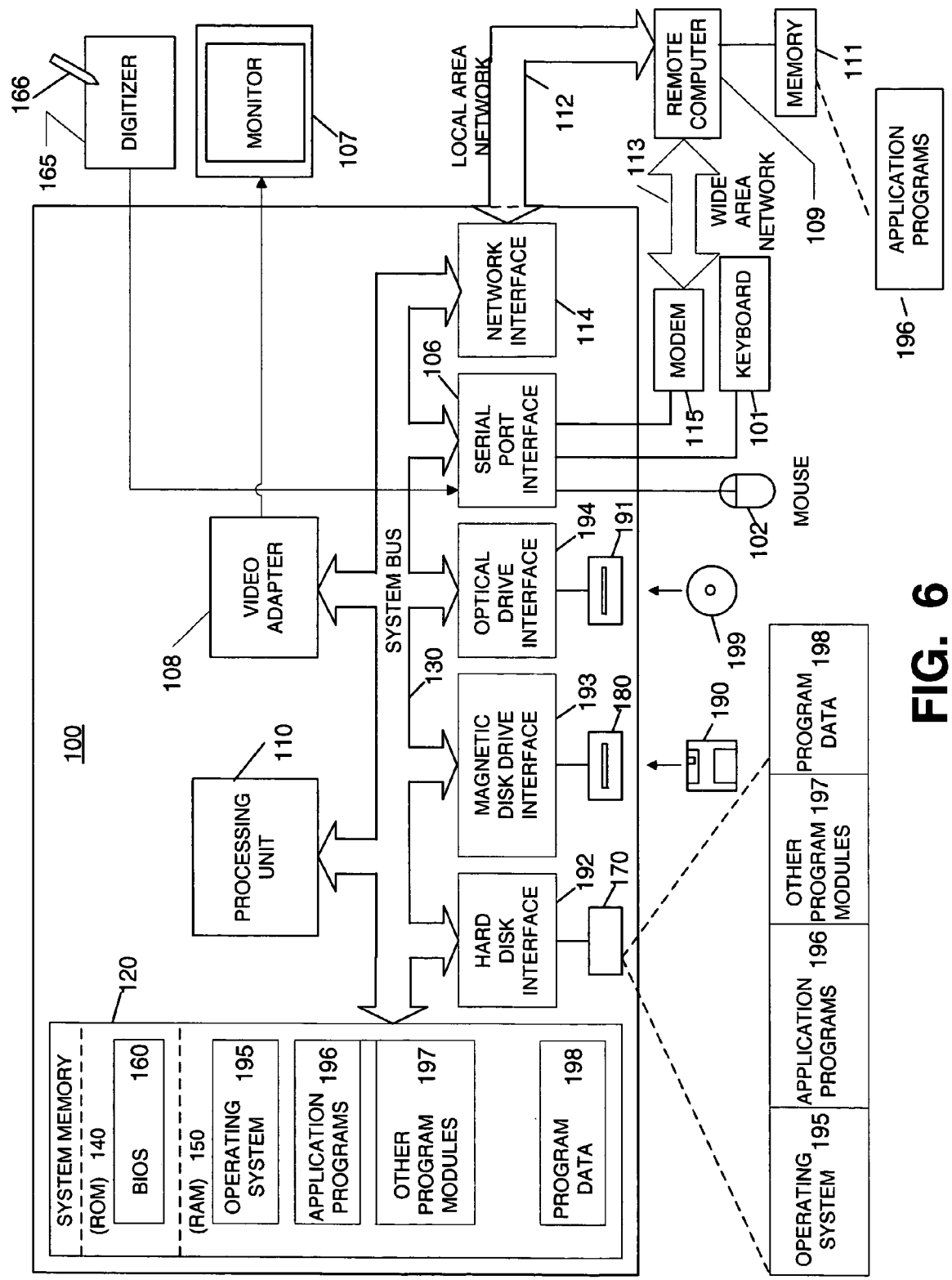
FIG. 6, which illustrates a schematic diagram of a conventional general-purpose digital computing environment in which one or more examples of the present invention may be implemented.

FIG. 6 illustrates a schematic diagram of a conventional general-purpose digital computing environment that can be used to implement various aspects of the present invention. In FIG. 6, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB). Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 6, in practice, the pen digitizer 165 may be directly coupled to the processing unit 110, or it may be coupled to the processing unit 110 in any suitable manner, such as via a parallel port or another interface and the system bus 130 as known in the art. Furthermore, although the digitizer 165 is shown apart from the monitor 107 in FIG. 6, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 6. The logical connections depicted in FIG. 6 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 6 environment shows an example environment, it will be understood that other computing environments may also be used. For example, one or more examples of the present invention may use an environment having fewer than all of the various aspects shown in FIG. 6 and described above, and these aspects may appear in various combinations and subcombinations that will be apparent to one of ordinary skill.

Figure 7:
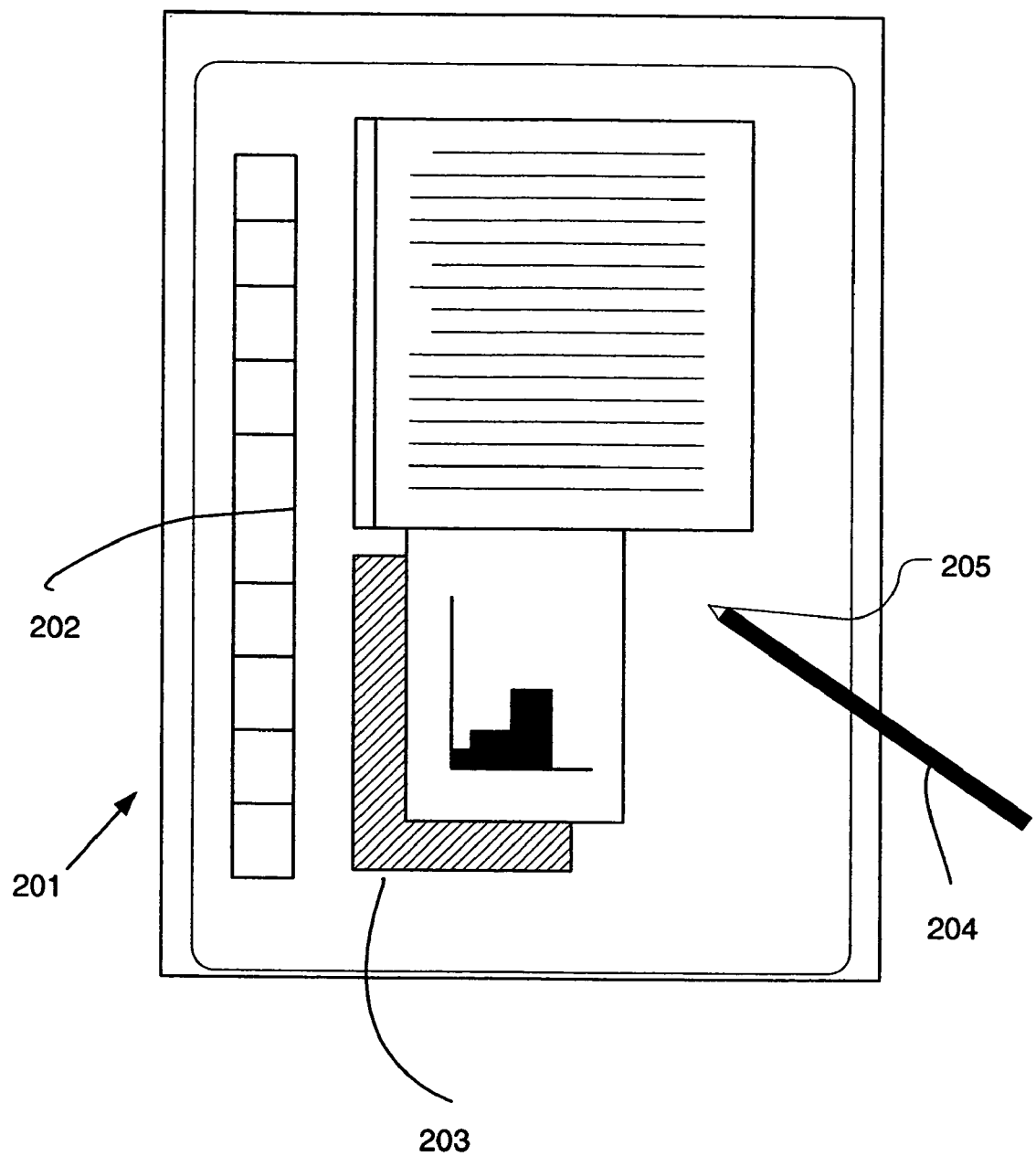
FIG. 7, which illustrates a pen-based personal computing (PC) environment in which one or more examples of the present invention may be implemented.

FIG. 7 illustrates a pen-based personal computer (PC) 201 that can be used in accordance with various aspects of the present invention. Any or all of the features, subsystems, and functions in the system of FIG. 6 can be included in the computer of FIG. 7. The pen-based personal computer system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its selection capabilities. In one example, a stylus 204 could be implemented as a "pencil" or "pen", in which one end constitutes a writing portion and the other end constitutes an "eraser" end, and which, when moved across the display, indicates portions of the display that are to be erased. Other types of input devices, such as a mouse, trackball, or the like also could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

V. Conclusion

In many instances, the above examples describe this invention in terms of use with electronic ink. This is merely an example. This invention can be used in combination with any type of electronic document, including, for example, documents from word processing programs, mathematics programs, drawing programs, documents downloaded from the internet, etc.

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A computer-readable medium having stored thereon a data structure associating an electronic document with a user interface window of varying size displayed within a display device having display dimensions, comprising:
    a first data field containing data indicating display dimensions of the electronic document, the display dimensions of the electronic document being equal to or less than the display dimensions of the display device; and
    a second data field maintaining data indicating maximum display dimensions of the electronic document that have been displayed in the user interface window as the user interface window increases or decreases in size, wherein the data maintained in the second data field is associated with a digitized user-input entered into the user interface window, independent of a contemporaneous association with a scrolling view handle display or similar scroll bar display, since digitized user-input within the display dimensions of the electronic document can extend beyond the viewable sections of the user interface window.

2. A computer-readable medium according to claim 1, wherein the data in the first data field includes data indicating display coordinates of a bounding box containing all points in the electronic document.

3. A computer-readable medium according to claim 2, wherein the data in the second data field includes data indicating display coordinates that enclose all portions of the electronic document that have been displayed in the user interface window.

4. A computer-readable medium according to claim 1, wherein the data in the second data field includes data indicating display coordinates that enclose all portions of the electronic document that have been displayed in the user interface window.

5. A computer-readable medium according to claim 1, wherein said display device includes a touch-sensitive display such that the digitized user input is entered into the user interface window via the touch-sensitive display.

6. A computer-readable medium according to claim 1, wherein said digitized user-input includes electronic ink.

7. A method for managing a data structure associating an electronic document with a user interface window of varying size displayed within a display device having display dimensions, said data structure comprising:
    a first data field containing data indicating display dimensions of the electronic document, the display dimensions of the electronic document being equal to or less than the display dimensions of the display device; and
    a second data field maintaining data indicating maximum display dimensions of the electronic document that have been displayed in the user interface window,
    said method comprising: as the user interface window increases or decreases in size, maintaining the data in the second data field in association with a digitized user-input entered into the user interface window, independent of a contemporaneous association with a scrolling view handle display or similar scroll bar display, since digitized user-input within the display dimensions of the electronic document can extend beyond the viewable sections of the user interface window.

8. A method according to claim 7, wherein the data in the first data field includes data indicating display coordinates of a bounding box containing all points in the electronic document.

9. A method according to claim 7, wherein the step of maintaining data in the second data field includes maintaining data indicating display coordinates that enclose all portions of the electronic document that have been displayed in the user interface window.

10. A method according to claim 8, wherein the step of maintaining data in the second data field includes maintaining data indicating display coordinates that enclose all portions of the electronic document that have been displayed in the user interface window.

11. A method according to claim 7, wherein said display device includes a touch-sensitive display such that the digitized user input is entered into the user interface window via the touch-sensitive display.

12. A method according to claim 7, wherein said digitized user-input includes electronic ink.

13. A computing device having a storage for a data structure associating an electronic document with a user interface window of varying size displayed within a display device having display dimensions, said storage for said data structure comprising:
    a first data field containing data indicating display dimensions of the electronic document, the display dimensions of the electronic document being equal to or less than the display dimensions of the display device; and
    a second data field maintaining data indicating maximum display dimensions of the electronic document that have been displayed in the user interface window,
    said computing device, as the user interface window increases or decreases in size, maintaining the data in the second data field in association with a digitized user-input entered into the user interface window, independent of a contemporaneous association with a scrolling view handle display or similar scroll bar display, since digitized user-input within the display dimensions of the electronic document can extend beyond the viewable sections of the user interface window.

14. A computing device according to claim 13, wherein the data in the first data field includes data indicating display coordinates of a bounding box containing all points in the electronic document.

15. A computing device according to claim 13, wherein the maintaining data in the second data field includes maintaining data indicating display coordinates that enclose all portions of the electronic document that have been displayed in the user interface window.

16. A computing device according to claim 14, wherein the maintaining data in the second data field includes maintaining data indicating display coordinates that enclose all portions of the electronic document that have been displayed in the user interface window.

17. A computing device according to claim 13, wherein said display device includes a touch-sensitive display such that the digitized user input is entered into the user interface window via the touch-sensitive display.

18. A computing device according to claim 13, wherein said digitized user-input includes electronic ink.

* * * * *